O. E. RUHOFF.
ZINC FURNACE.
APPLICATION FILED MAR. 26, 1914.
1,121,874.
Patented Dec. 22, 1914.
2 SHEETS—SHEET 1.
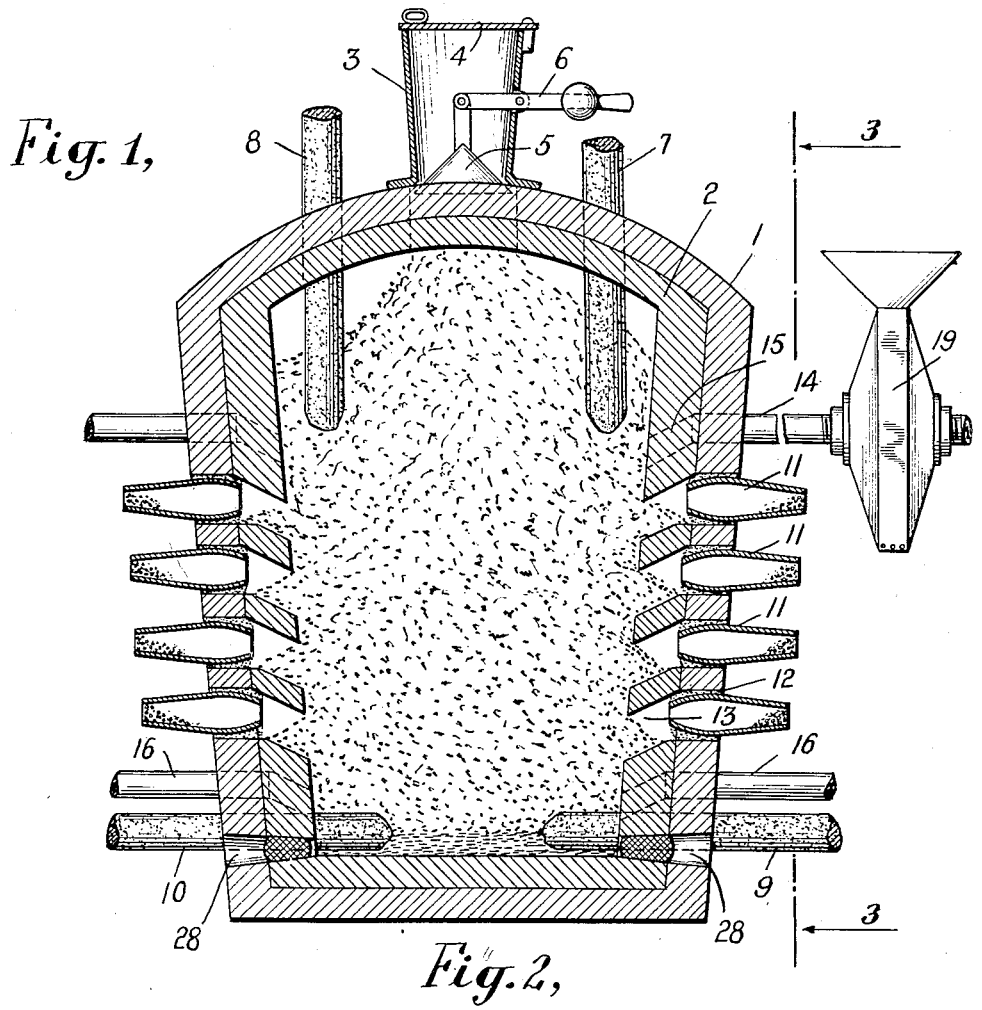
Fig. 1,
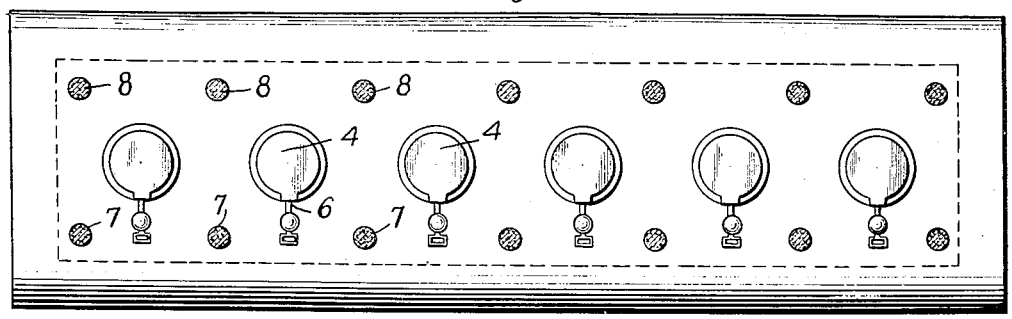
Fig. 2,
WITNESSES
C. B. Schroeder
L. Bates
INVENTOR
O. E. Ruhoff,
BY
Arbath Marvin
ATTORNEY O. E. RUHOFF.
ZINC FURNACE.
APPLICATION FILED MAR. 26, 1914.
1,121,874.  Patented Dec. 22, 1914.
2 SHEETS—SHEET 2.
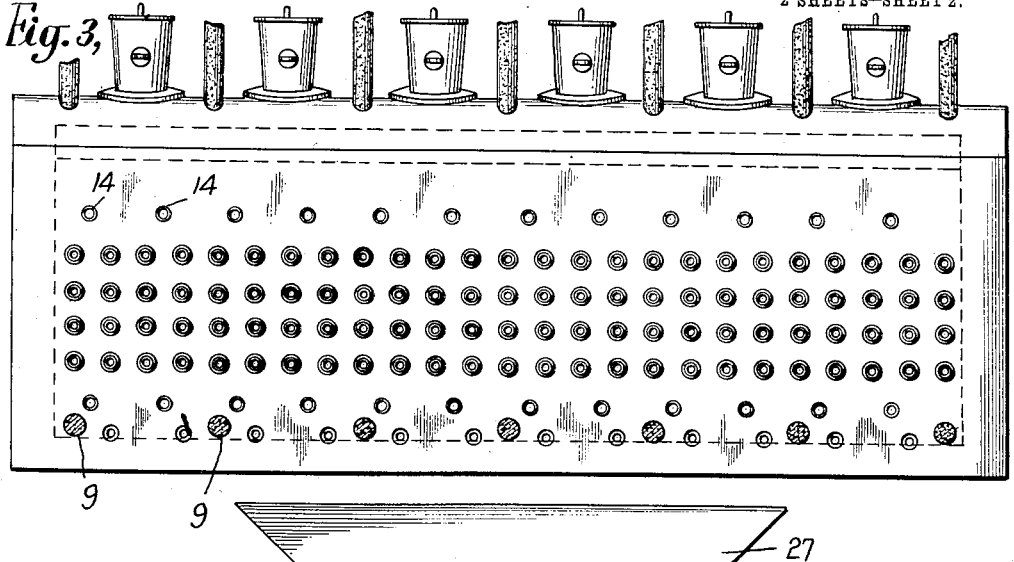
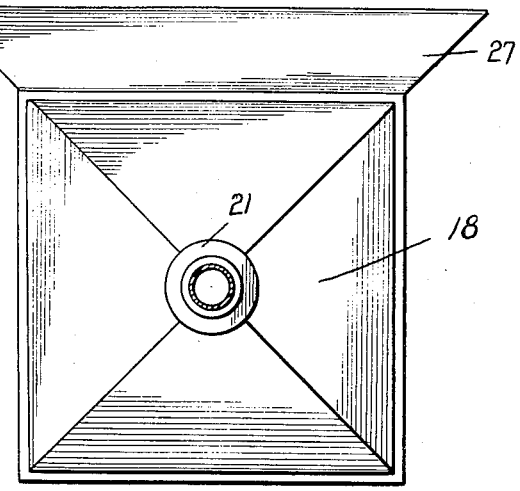
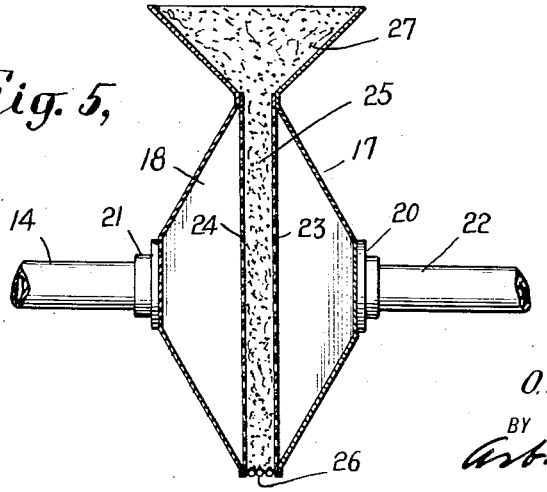
WITNESSES
INVENTOR
O. E. Ruhoff
BY
ATTORNEY

UNITED STATES PATENT OFFICE.

OTTO ERNST RUHOFF, OF MADISON, WISCONSIN.

ZINC-FURNACE.

1,121,874.     Specification of Letters Patent.     Patented Dec. 22, 1914.

Application filed March 26, 1914. Serial No. 827,278.

*To all whom it may concern:*

Be it known that I, OTTO ERNST RUHOFF, a citizen of the United States, residing at Madison, county of Dane, State of Wisconsin, have invented certain new and useful Improvements in Zinc-Furnaces; and I do hereby declare the following to be a full, clear, and exact description of the invention, such as will enable others skilled in the art to which it appertains to make and use the same.

It is the object of the present invention to provide an electric furnace for the smelting of zinc ores, this furnace being of such construction that it will operate satisfactorily on ores producing a corrosive slag such as would destroy the retorts of furnaces of the usual combustion type. Much cheaper ores can thus be used.

It is a further object to provide a furnace in which a better recovery of zinc can be obtained and in which the heat can be run up to a higher temperature than is possible in a retort furnace where the temperature is limited by the softening point of the fire clay retorts.

It is a further object to reduce the cost of labor and to effect a recovery of other metals than zinc, such as lead, copper, gold and silver, this recovery being made in a way simpler than is possible with the present types of furnaces, wherein the expense of such recovery is found prohibitive since these valuable additional metals are mixed with large quantities of unconsumed coal and slag.

It is a further object to prolong the contact between the ore and the reducing material and to effect a uniform heating throughout all parts of the furnace and to guard against reoxidation within the furnace, and to effect prompt condensation within a condensing system of adequate cooling surface while at the same time preventing chilling.

It is a further object to separate to some extent the distillation products and to provide a special set of filters for collecting blue powder as given off when the ore mixture first passes into the heated zone; and to otherwise separate the materials to be condensed so that troublesome interaction may not occur.

To accomplish the above objects and to effect results the details of which are made clear by the following description, I make use of an electric furnace of the resistance type, one embodiment of which is shown in the accompanying drawings, wherein—

Figure 1 is a sectional elevation of the furnace somewhat diagrammatic in character and showing one only of the blue powder filters; Fig. 2 is a plan view of the furnace illustrated on a reduced scale; Fig. 3 is a side elevation of the furnace; Fig. 4 is an end elevation of the blue powder filter, and Fig. 5 is a central section through the filter showing its perforated plates and filling of carbon.

In the embodiment illustrated, the furnace is of rectangular cross-section and has a length several times greater than its width or height. It preferably has an arched roof and tapers from top to bottom, and the degree of tapering may vary in accordance with the distribution of heat to be effected by the passage of electricity through the conducting charge of the furnace.

In the drawings, the furnace is illustrated as comprising an outer wall 1 lined throughout with the usual refractory material 2. No buckstays or tie-rods are shown and in other respects the illustration is somewhat diagrammatic, for a complete understanding of my present invention, and a disclosure of its underlying features and principle of operation is independent of these structural and mechanical details.

The walls of the furnace must be of ample thickness not only to prevent loss of heat by radiation, but also to prevent the presence of a cold zone close to the walls, for that woud tend to result in a reoxidation of the reduced zinc in accordance with the reactions hereinafter expressed.

A plurality of charging openings are provided through the top of the furnace, these being in large number, as, for instance, seven, as on the furnace here shown, and being equally spaced to effect an even distribution of the furnace charge during operation, it being understood that this furnace is intended for continuous work. Surmounting each charging opening is a flaring hopper 3 with a cover 4 and with a feed controlling cone 5 carried on a counter-weighted hand lever 6. By manipulation of this lever the feed of ore mixture may be adequately controlled in accordance with the needs of the particular part of the furnace supplied by that particular hopper.

It is an essential feature of this furnace that there be a relatively large number of electrodes through which the current may be delivered to heat the ore and its reducing agent. In the embodiment here shown, the upper electrodes 7 and 8 are grouped in two rows, seven to a row, and are spaced equidistant along the row with an intervening distance between adjacent electrodes equal to the distance between rows. This arrangement is made to secure the advantage of a comparatively uniform delivery of electrical energy to the ore mixture at the top of the furnace. These top electrodes preferably pass vertically through the top of the furnace and are all supplied with current of the same polarity preferably each through a separate switch, and usual means for feeding the electrodes into the furnace as fast as they are consumed may be used but need not here be illustrated.

Opposed to the 14 top electrodes are 14 lower electrodes all of the same polarity but arranged in two groups, those marked 9 projecting horizontally through one side wall near the bottom of the furnace, and those marked 10 projecting horizontally through the other side wall. These electrodes are spaced to correspond with the top electrodes.

With the above described arrangement of electrodes the current flow through the conductive ore mixture is relatively uniform throughout the entire body of the furnace charge, and the furnace charge is relatively free from cool pockets or from very hot zones, and this uniformity in the heating is responsible for many of the advantageous results inherent in my invention.

The condensing system of the furnace comprises a relatively great number of clay condensers 11 of the kind and shape now commonly used in zinc retort furnaces, and these condensers are set into the brick work by means of a packing 12 of fire clay. Each day in the operation of the furnace the condensers are taken off and scraped out, and after being replaced are luted in with the moist fire clay which serves as a seal between the condenser and the rest of the furnace. In accordance with the practice in retort furnaces a handful of hard coal screens is placed in the outer ends of the condensers each time after the condensed zinc is drawn off. This coal serves to throttle the condenser outlet. The inner end of each condenser opens into a cylindrical passage 13 which extends through the furnace lining 2 and preferably is sloped downwardly to shield the condenser from the entrance of the ore mixture or of fluid parts or components thereof. As another part of the condensing system I arrange a row of iron pipes 14 along each side of the furnace above the topmost clay condensers, and each of these pipes leads to a blue powder filter, one only of which is shown in Fig. 1, and the details of which are more clearly shown in Figs. 4 and 5. The inner or furnace end of each pipe 14 is turned downward at 15 to prevent the free passage of the ore mixture into the end of the pipe and to prevent stoppage by slag or the like. Along the bottom of the furnace only slightly above the electrodes 9 and 10 are arranged two more rows of iron pipes 16, each of which like pipes 14, leads to a blue powder filter of the construction illustrated in Figs. 4 and 5.

The filters, one of which is shown in Figs. 4 and 5, comprise a pair of pyramid-shaped plates spaced apart by an encircling strip 19 (Fig. 1) to form a box. The apexes of the pyramid-shaped plates are flattened for connection with collars 20 and 21, the latter being screw-threaded to pipe 14 and the former being screw-threaded to an outlet pipe 22. Through the middle of the box so formed and establishing a barrier therein are a pair of perforated steel plates 23 and 24, and between these plates is introduced coke breeze 25 to serve as a screen for collecting the blue powder carried over from the furnace through pipe 14. At the bottom of the coke receiving pocket is a shaking grate 26 whereby the coke may be removed from time to time with its charge of collected blue dust and replenishment of the coke screenings may be made through a hopper 27 at the top of the box.

Throughout the length of the furnace on both sides tap holes 28 are provided each sealed with a removable plug and through these tap holes slag and the like may be drawn off from the furnace.

While the drawings show a furnace of certain specific proportions, and of a certain particular construction, the underlying features of my present invention may be used in furnaces differing therefrom in various particulars; and for a better understanding of the principles involved, irrespective of the particular shape or dimensions of the furnace, it is considered advisable to here set forth the mode of operation and its underlying theories.

As compared with arc furnaces the furnace of my invention affords a better recovery of zinc since the contact between the ore and the reducing material is much more prolonged. For this reason it is not necessary to regulate so closely the exact chemical composition of the slag. In the past, electric furnace experimenters have seemed convinced that there was nothing good or economic about the design of a retort furnace, and in putting up electric furnaces for the treatment of zinc ore have apparently attempted to get as far away as possible from anything resembling a standard type of retort zinc furnace. This I believe to have been a mistake, and one of the ideas upon which the design of the present furnace and condensing system is based is that in substituting electrical heating for the more customary methods, advantage can be had from maintaining those features of furnace design and operation which have been found advantageous in retort furnaces.

In my opinion too much stress has heretofore been laid on the necessity for slow condensation of zinc vapors. While an instantaneous chilling of the vapors by having them strike against a cold surface is not permissible, still on the other hand it is essential to secure a prompt condensation in order to prevent a reoxidation of the vapors according to the reactions:

$$2CO = CO_2 + C$$
$$CO_2 + Zn = ZnO + CO$$

These reactions take place with varying rapidity at temperatures between the boiling of zinc and its melting point. The furnace here disclosed is of such construction that no portion of the ore bed is more than about three feet from some portion of the condensing system. This reoxidation is also likely to take place if the condensing system has a high cubical content in proportion to its wall space. The actual cooling and condensing takes place, of course, only at the walls, and therefore the wall area should be as large as possible in proportion to the cubical contents. This is provided for in the present furnace by having a large number of condensers of comparatively small diameter, and since the surface of the condensing vessel varies with the square of the dimensions while the volume varies with the cube of the dimensions, the present arrangement offers many advantages. A too rapid chilling of the vapors is prevented by using clay condensers of the shape and size here indicated, these being similar to those used at present in retort furnaces.

While the four rows of condensers along both sides of the furnace take care of the greater part of the condensation, the supplementing condensers above and below these four rows take care of the blue powder formation. The material given off at the upper row corresponds in a measure to that produced in a retort-furnace at the beginning of the distillation period. The lowest row takes care of the vapors produced at the electrodes where the temperature is at times too high to get good condensation. Here again some blue powder is formed. Another purpose of using a special design for the uppermost and lowermost rows of condensers is to prevent any mixing of the harmful gases given off at these levels with the vapors entering the clay condensers where they might interfere with proper condensation. The coke breeze, hard coal screenings or similar material held between the two vertical screens of the filter becomes after a time partially choked with blue powder, but as fast as this occurs the coal mixed with blue powder is shaken out at the bottom for subsequent treatment in the furnace to recover the zinc values.

The use of an exceedingly high temperature of distillation has been found to produce complex compounds of zinc with sulfur, silicon or carbon or several or all of these. Such compounds represent zinc in an uncondensable form, and although encountered in the use of arc furnaces because of the excessive local heat at the arc, may be avoided by the use of the present resistance furnace where the heat is very evenly distributed and under easy control.

In using an arc furnace for operation on zinc ores, the temperatures at points well removed from the arc are found much below the reduction temperature of zinc oxid, and at such points reoxidation of zinc vapors in accordance with the reactions above set forth proceeds with great rapidity. This difficulty is avoided in the present furnace because there are no cold pockets where reoxidation could occur. In operating the furnace if the attendant sees that distillation is beginning to take place too rapidly at one point the pair of electrodes at that point can be shut off for as long a period as is necessary, possibly ten or fifteen minutes, and after heat equilibrium has been restored the electrodes can be thrown again into circuit. The rapidity of distillation, which will serve as a guide for such temporary shutting off of one pair of electrodes, can be very readily noted from the volume of flame leaving the mouth of the clay condenser, this being a sensitive method for indicating the rapidity of distillation.

The charge consists of a zinc ore or compound intimately mixed with coke breeze, the latter serving to impart the necessary conductivity to the charge. The amount of coke or other reducing material to be mixed with the zinc ore will be, on an average, the amount required for the reduction of the various oxid compounds in the ore. When the furnace is in action, indication will be given as to whether the right amount is being added by the volume and appearance of CO flame leaving the lowest row of condensers.

The charge may or may not be preheated. The operation of the furnace is continuous, a fresh portion of charge being added at convenient intervals of possibly one hour. The slag and matte are tapped off at the bottom of the furnace and treated further for the recovery of other metals.

With the furnace of my invention, the reaction is well distributed throughout the comparatively large cubical contents of the furnace, thereby eliminating to a great extent the carrying forward of dust from the point of distillation to the condensers, a difficulty experienced in the use of arc furnaces because of the violent local reaction brought about at the arc. Also the trouble from dust is much reduced when a large number of condensers are used, as described, since there are then a great number of comparatively slow currents of gas and the dust is less likely to be carried forward with the flow than is the case when one or only a few condensers are used.

It will be understood that dust, floating in the zinc vapors, interferes with the condensation of the zinc to coherent metal and results in the formation of excessive blue powder.

I claim:

1. A zinc furnace of the resistance type, having a plurality of charge openings distributed along its top through which a conductive mixture of zinc ore and reducing material may be admitted to the furnace at will, a plurality of electrodes of one polarity arranged along the top of the furnace in contact with said conductive charge, a corresponding set of electrodes at the bottom of the furnace in contact with said charge, said electrodes at the top and bottom of the furnace being in relatively large numbers and being uniformly distributed to effect a uniform heating of the charge by the current passing therethrough and eliminating cool spaces in the furnace at which reoxidation of zinc might occur, and a relatively large number of clay condensers communicating with said charge through the walls of the furnace, said condensers being individually of small volume and easily accessible to the adjacent portion of the furnace charge so that condensation may be brought about quickly and without opportunity for reoxidation or chilling of the zinc vapor.

2. A zinc furnace of the resistance type, having a plurality of charge openings distributed along its top through which a conductive mixture of zinc ore and reducing material may be admitted to the furnace at will, a plurality of electrodes of one polarity arranged along the top of the furnace in contact with said conductive charge, a corresponding set of electrodes at the bottom of the furnace in contact with said charge, said electrodes at the top and bottom of the furnace being in relatively large numbers and being uniformly distributed to effect a uniform heating of the charge by the current passing therethrough and eliminating cool spaces in the furnace at which reoxidation of zinc might occur, and a relatively large number of clay condensers communicating with said charge through the walls of the furnace, said condensers being individually of small volume and easily accessible to the adjacent portion of the furnace charge so that condensation may be brought about quickly without opportunity for reoxidation or chilling of the zinc vapor, and supplementary condensers positioned to communicate with said furnace charge above and below the clay condensers, said supplementary condensers being provided with a coal barrier through which products from the furnace pass and by which blue powder is collected; substantially as described.

3. A zinc furnace of the resistance type having a plurality of charging openings uniformly distributed along its top through which a conductive mixture of zinc ore and reducing agent may be admitted as desired for continuous operation of the furnace, a relatively large number of electrodes of one polarity positioned at the top of the furnace and a corresponding number of electrodes of the opposite polarity positioned at the bottom of the furnace, said electrodes being uniformly distributed in the furnace charge to effect uniform heating thereof when current flows through the charge, and to raise said charge uniformly to the temperature necessary for reduction of the ore, tap openings distributed along the furnace through which the slag and matte may be drawn off when the furnace is in continuous operation, and a large number of relatively small condensers uniformly distributed along the sides of the furnace and easily accessible to zinc vapors arising from reduction of the charge when heated by the current passing therethrough, said condensers being individually of small volume and large surface area to insure speedy and effective condensation of the zinc vapors without chilling.

4. A zinc furnace of the resistance type having a relatively large number of charging openings through which ore and reducing material may be admitted for continuous operation, a relatively large number of upper electrodes all of the same polarity and located adjacent to said charging openings, another set of electrodes near the bottom of the furnace and of the opposite polarity, said electrodes being uniformly distributed to equalize the flow of current through the charge when acting as a resistor for the furnace, a relatively large number of small clay condensers positioned in the side of the furnace and adapted to quickly condense the zinc vapors liberated by the heating action of the current on the charge but without chilling said vapors, and supplementary condensers positioned near to said electrodes and adapted to collect blue powder from those parts of the furnace wherein its production is greatest; substantially as described.

5. The combination in a zinc furnace of the resistance type of means for continuously admitting a conductive charge to the furnace, electrodes for delivering current through said charge, condensers positioned to receive the zinc vapor liberated by the charge when heated with the current passed therethrough, and supplementary condensers communicating with the furnace charge near its places of admission, said condensers including a coal barrier serving as a screen through which the products from the furnace must pass and by which the blue powder is collected.

6. A continuously operating zinc furnace of the resistance type, comprising a relatively long and narrow furnace chamber tapering from top to bottom, and substantially filled at all times with a conductive mixture of zinc ore and reducing agent, electrodes uniformly distributed along the top of the furnace to establish electrical connection with the conductive charge, electrodes uniformly distributed along the bottom of the furnace to coöperate with the upper electrodes in the passage of current through the charge, and a relatively large number of small clay condensers arranged in the walls of the furnace to receive vapors therefrom to be condensed, charging openings distributed along the top of the furnace through which charging material may be introduced, and tap openings distributed along the bottom of the furnace through which fusible material may be withdrawn to maintain the furnace continuously in operation.

7. A zinc furnace of relatively great length as compared with its height and width, having a plurality of electrodes uniformly distributed along its top with charging openings interposed between adjacent electrodes to which a conductive mixture of zinc ore and reducing agent may be continuously introduced into the furnace, a relatively large number of small clay condensers positioned along the sides of the furnace to condense the zinc vapors liberated by the heated charge when current passes therethrough, supplementary condensers equipped with filters and communicating with the furnace charge above said first named condensers, electrodes uniformly distributed along the bottom of the furnace and a series of tap openings near said lower electrodes for the removal of slag and matte.

8. A zinc furnace of relatively great length as compared with its height and thickness, and tapering from the top toward the bottom, said furnace having a plurality of charging openings along its top and electrodes uniformly distributed throughout said top to equalize the heating action when current passes from said electrodes through the furnace charge, lower electrodes arranged in pairs along the bottom of the furnace and projecting horizontally thereinto, a relatively large number of clay condensers arranged along the side walls of the furnace in position to quickly condense the vapors set free by the passage of current through the charge from said upper to said lower electrodes and supplementary condensers communicating with said furnace above and below said clay condensers and provided with filtering means for collecting blue powder, said filtering means comprising a screen of carbonaceous material suitably supported in the path of the products escaping from the furnace.

In testimony whereof I affix my signature, in presence of two witnesses.

OTTO ERNST RUHOFF.

Witnesses:
  J. E. BYRNS,
  A. O. OLMAN.